(12) United States Patent
Lefavour et al.

(10) Patent No.: US 10,010,954 B2
(45) Date of Patent: Jul. 3, 2018

(54) CUTTER

(75) Inventors: John D. Lefavour, Litchfield, NH (US); Thomas R. Faucher, Manchester, NH (US); Lawrence N Brown, Ctr Barnstead, NH (US); Shane M. Hopps, Whitefield, NH (US)

(73) Assignee: Hubbell Incorporated, Shelton, CT (US)

( * ) Notice: Subject to any disclaimer, the term of this patent is extended or adjusted under 35 U.S.C. 154(b) by 1556 days.

(21) Appl. No.: 12/590,217

(22) Filed: Nov. 4, 2009

(65) Prior Publication Data

US 2010/0107843 A1     May 6, 2010

Related U.S. Application Data

(60) Provisional application No. 61/198,339, filed on Nov. 5, 2008.

(51) Int. Cl.
| B23D 29/02 | (2006.01) |
| B23D 35/00 | (2006.01) |
| B23D 29/00 | (2006.01) |
| B23D 17/00 | (2006.01) |
| B23D 17/06 | (2006.01) |

(52) U.S. Cl.
CPC ......... B23D 29/002 (2013.01); B23D 17/00 (2013.01); B23D 17/06 (2013.01); B23D 35/002 (2013.01); *Y10T 83/8802* (2015.04); *Y10T 83/8878* (2015.04); *Y10T 83/9447* (2015.04)

(58) Field of Classification Search
CPC .... B23D 29/002; B23D 35/002; B23D 17/00; B23D 17/06; Y10T 83/9447; Y10T 83/8802; Y10T 83/8878
USPC .... 83/694, 928; 30/180, 362, 228, 349, 179, 30/227, 236, 260, 229; 72/409.1, 409.13, 72/409.12, 409.15, 453.15–453.16, 389.6, 72/409.01, 456, 333, 327, 331, 313, 72/409.06, 409.08; 7/134–135, 107; 81/418, 420, 421–423, 424, 424.5, 426, 81/419, 301, 302; 241/264; 29/268, 29/453.01; 144/34.5, 339; D8/52
See application file for complete search history.

(56) References Cited

U.S. PATENT DOCUMENTS

| 1,308,516 | A | * | 7/1919 | Weinstein | 72/409.08 |
| 2,404,985 | A | * | 7/1946 | Rembold | 30/229 |
| 2,751,681 | A | * | 6/1956 | Hillson | 30/229 |
| 3,205,568 | A |   | 9/1965 | Stull | 72/410 |
| 3,470,728 | A |   | 10/1969 | Polidori | 72/410 |
| 3,597,775 | A | * | 8/1971 | McCasland | 7/106 |
| 3,732,718 | A | * | 5/1973 | Barberio et al. | 72/409.16 |
| 4,272,888 | A | * | 6/1981 | Hartmeister | 30/229 |
| 4,292,833 | A |   | 10/1981 | Lapp | 72/416 |
| 4,381,661 | A | * | 5/1983 | Wiener et al. | 72/409.12 |

(Continued)

*Primary Examiner* — Laura M Lee
(74) *Attorney, Agent, or Firm* — Harrington & Smith

(57) ABSTRACT

A hydraulic tool cutting dies including first and second cutting dies. The first cutting die has a first mounting section and a first cutting edge. The first mounting section is sized and shaped to removably attached to a hydraulic tool. The second cutting die has a second mounting section and a second cutting edge. The second mounting section is sized and shaped to removably attached to the hydraulic tool. The first cutting die includes a post extending past the first cutting edge and the second cutting die includes a post receiving area which has a different cross-sectional shape than the post.

21 Claims, 17 Drawing Sheets

(56) References Cited

U.S. PATENT DOCUMENTS

| | | | |
|---|---|---|---|
| 4,719,789 A * | 1/1988 | Wiebe et al. | 72/409.01 |
| 4,729,170 A * | 3/1988 | Hartmeister | 30/363 |
| 4,845,854 A * | 7/1989 | Stevens et al. | 30/227 |
| 5,033,195 A * | 7/1991 | Appelkvist et al. | 30/254 |
| 5,183,216 A * | 2/1993 | Wack | 241/101.73 |
| 5,207,014 A * | 5/1993 | Panella | 43/4 |
| 5,228,325 A | 7/1993 | Wiebe et al. | 72/410 |
| 5,301,882 A * | 4/1994 | Morikawa et al. | 241/101.73 |
| 5,419,045 A * | 5/1995 | Magdich | 30/145 |
| 5,485,641 A * | 1/1996 | Machmeier et al. | 7/134 |
| 5,501,128 A | 3/1996 | D'Amore | |
| 5,586,584 A * | 12/1996 | Haldemann | 140/123.5 |
| 5,890,667 A * | 4/1999 | Sakato et al. | 241/264 |
| 6,125,682 A | 10/2000 | Rzasa et al. | 72/412 |
| 6,145,418 A * | 11/2000 | Bares | 81/421 |
| 6,350,062 B2 | 2/2002 | Knecht et al. | 385/84 |
| 6,487,887 B2 * | 12/2002 | Yamada | 72/294 |
| 6,792,789 B1 | 9/2004 | Faucher | 72/456 |
| 6,910,363 B2 * | 6/2005 | Beetz et al. | 72/409.14 |
| 7,634,859 B2 * | 12/2009 | Amherd | 30/233 |
| 2005/0076513 A1 | 4/2005 | Brailovskiy | |
| 2005/0166405 A1* | 8/2005 | Lai | 30/229 |
| 2006/0272381 A1 | 12/2006 | Ayer et al. | 72/453.16 |

\* cited by examiner

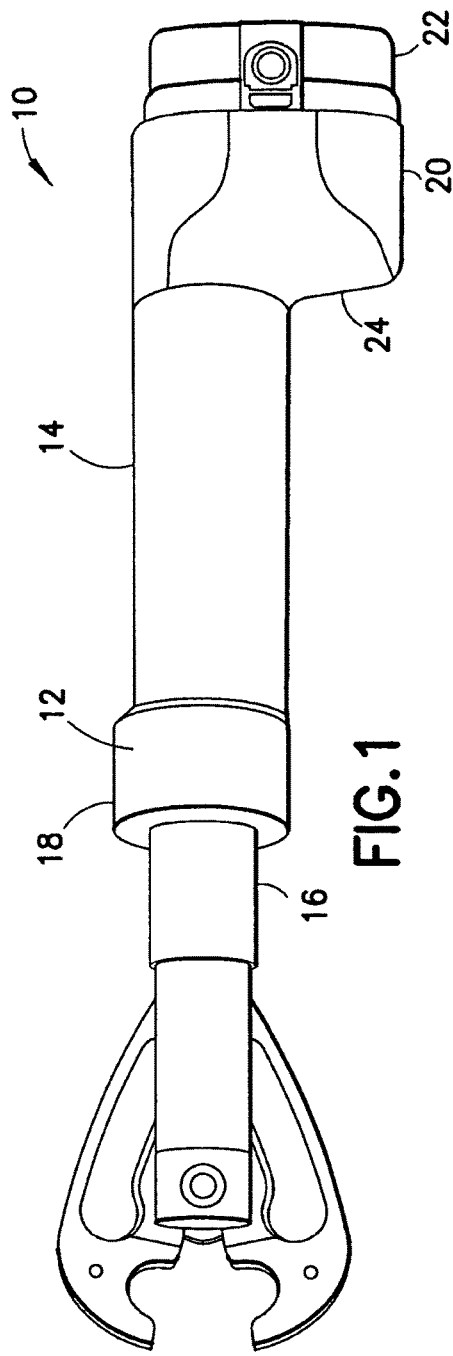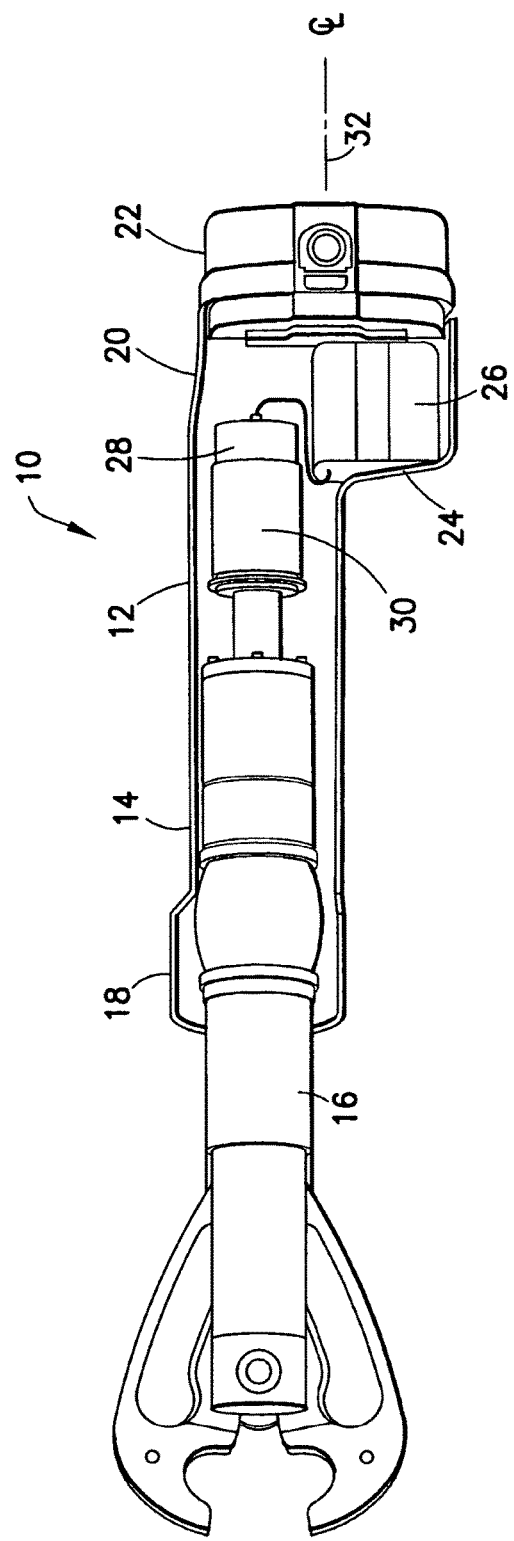

CUTTER

CROSS REFERENCE TO RELATED APPLICATION

This application claims priority under 35 U.S.C. 119(e) on provisional patent application No. 61/198,339 filed Nov. 5, 2008 which is hereby incorporated by reference in its entirety.

BACKGROUND OF THE INVENTION

Field of the Invention

The invention relates to a cutter and, more particularly, to a tool having cutting dies.

Brief Description of Prior Developments

U.S. Pat. No. 6,125,682, which is hereby incorporated by reference in its entirety, discloses a hydraulic tool alignment guard. U.S. Pat. No. 6,792,789 B1, which is hereby incorporated by reference in its entirety, discloses a hydraulic tool having removable cutting dies and crimping dies.

SUMMARY

The following summary is merely intended to be exemplary. The summary is not intended to limit the scope of the claimed invention.

In accordance with one aspect of the invention, a hydraulic tool cutting dies is provided including first and second cutting dies. The first cutting die has a first mounting section and a first cutting edge. The first mounting section is sized and shaped to removably attached to a hydraulic tool. The second cutting die has a second mounting section and a second cutting edge. The second mounting section is sized and shaped to removably attached to the hydraulic tool. The first cutting die includes a post extending past the first cutting edge and the second cutting die includes a post receiving area which has a different cross-sectional shape than the post.

In accordance with another aspect of the invention, a hydraulic tool cutting dies is provided comprising a first cutting die and a second cutting die. The first cutting die has a first mounting section and a first cutting edge. The first mounting section is sized and shaped to removably attached to a hydraulic tool. The second cutting die has a second mounting section and a second cutting edge. The second mounting section is sized and shaped to removably attached to a hydraulic tool. The first cutting die comprises post receiving areas on opposite sides of the first cutting edge, and the second cutting die comprises posts on opposite sides of the second cutting edge which are adapted to be located in the post receiving areas as the first and second cutting edges approach each other.

In accordance with another aspect of the invention, a hydraulic tool cutting dies comprising a first cutting die and a second cutting die. The first cutting die has a first mounting section and a first cutting edge. The first mounting section is sized and shaped to removably attached to a hydraulic tool. The second cutting die has a second mounting section and a second cutting edge. The second mounting section is sized and shaped to removably attached to a hydraulic tool. The first cutting die comprises opposing guide slots, wherein the second cutting die comprises top and bottom sides, wherein the opposing guide slots are sized and shaped to receive the top and bottom sides of the second cutting die.

BRIEF DESCRIPTION OF THE DRAWINGS

The foregoing aspects and other features of the invention are explained in the following description, taken in connection with the accompanying drawings, wherein:

FIG. 1 is a side view of a tool;

FIG. 2 is a partial cut away view of the tool shown in FIG. 1;

DETAILED DESCRIPTION OF EMBODIMENTS

Figure 3:
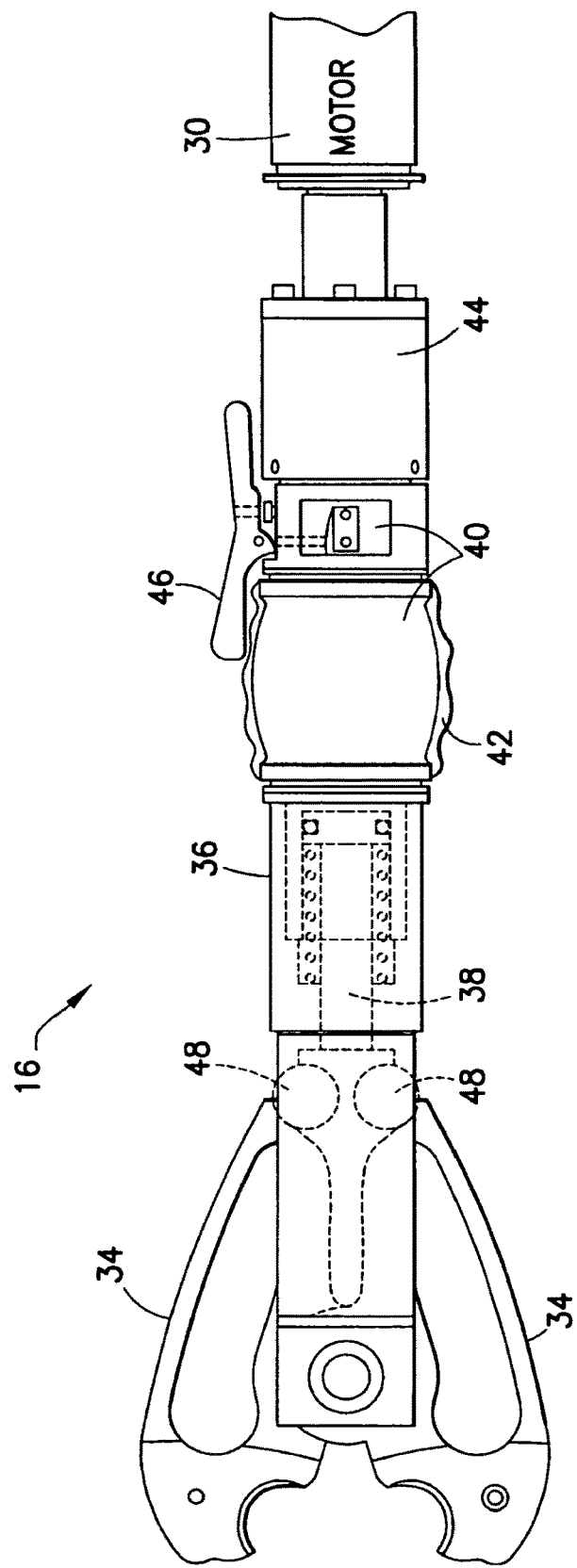
FIG. 3 is a side view of some of the components of the tool shown in FIGS. 1-2.

Referring to FIG. 1, there is shown a side view of a tool 10. The tool 10 is described in U.S. patent Publication No.

US-2006-0272381-A1 which is hereby incorporated by reference in its entirety. However, in alternate embodiments, features of the invention could be used in any suitable type of tool. FIGS. 1-2 shown a configuration of the tool 10 with an outer housing 12 having a general rod shaped handle section 14, which can be at least partially cross-sectionally tri-lobe shaped for example. An in-line subassembly 16 is provided inside the outer housing 12 comprising the front jaw assembly, the frame, the pump, the motor, the transmission and the reservoir. A front end 18 of the housing 12 is slightly enlarged to help prevent a user's hand from sliding forward off of the handle section 14. The rear end 20 of the outer housing 12 is adapted to removably attach the battery 22. A lower extension 24 of the rear end 20 accommodates a portion 26 of the battery 22. The lower extension 24 also helps to prevent a user's hand from sliding rearward off of the handle section 14. In this design the front of the battery 22 at portion 26 extends past the rear end 28 of the motor 30. The centerline 32 of the battery is offset from the centerline of the subassembly 16.

Referring also to FIG. 3, the in-line assembly 16 is shown with the outer housing removed. The tool 10 is essentially an in-line (or at least partially in-line) type of compression tool for crimping an electrical connector onto a conductor or for cutting a member, such as an electrical cable for example. The assembly 16 has jaws 34 configured to receive either crimping dies or cutting dies. The assembly 16 generally comprises a frame 36, a movable ram 38, a pump 40, a hydraulic fluid reservoir 42, a transmission 44, a motor 30, and a user control 46.

In this embodiment the user control 46 comprises a rocker member and a switch. The rocker member has middle section pivotably connected to the frame 36, a front section and a rear section. The bottom of the rocker member comprises a cam profile. An activation rod is provided between the cam profile and the switch. When the front section is depressed, the cam profile can move the activation rod inward to actuate the switch. The switch is coupled to the battery 22 and the motor 30 to control actuation of the motor. The rocker member is preferably spring biased at a neutral position. The front section forms an activation trigger. The rear section forms a retract trigger. The activation trigger and the retract trigger form a Rocker Control. The top of the release valve has a release button. This is merely an example of a user control. In alternate embodiments, any suitable user control could be provide.

The reservoir 42 generally comprises an annular configured reservoir surrounding a section of the Pump Body. The frame 36 includes a yoke. A jaw assembly is provided with the jaws 34. A spring is provided on the ram 38. The ram 38 includes rollers 48 for moving the jaws 34 as the ram 38 is extended.

The rear section of the rocker member has a surface located directly above the top of a pump release valve. When the rear section is depressed, the surface can move the pump release valve inward to release hydraulic fluid from behind the ram 38 back to the reservoir 42.

The switch is shown less its electrical wires. However, the wires would typically be configured to have one wire routed from the switch to the battery and the other wire from the switch to the motor. Alternatively, routings may include an electrical circuit thereby controlling the power ON/OFF power operation. The activation trigger and release button are shown in the form of a rocker switch, however, other configurations are possible. The rocker switch could easily be spring biased to the neutral position as shown.

Figure 18:
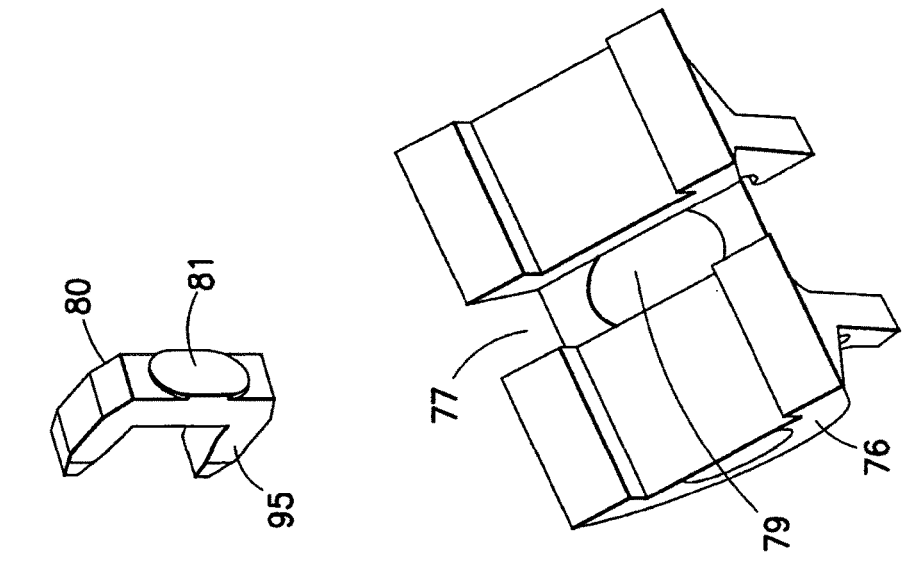
FIG. 18 is an exploded perspective view of the die shown in FIG. 16.

The rocker switch, when pushed on the end section closest to the crimp jaws, activates the operation of the tool. The rocker switch can incorporate a cam profile to push on the activation rod that easily activates the electrical switch. In a similar fashion an activation rod could easily be attached to the rocker member directly. Yet another option may be to have an arm extend directly off of the rocker control. In FIG. 18 the rocker control is located over the pump body section of the tool and is of considerable distance away from the front face of the motor. Likewise the switch is located on or adjacent to the pump body and is located a considerable distance (a distance of greater than four finger widths) from the front face of the motor. If the switch is located adjacent to the pump body the switch could be located in the plastic housing that will wrap the majority of the tool and provide an ergonomic interface for the operator.

The tool housing would have a grip region to be primarily over the gearbox and extend to the pump body section with a minor portion extending rearward over the motor. Another feature of the invention is the distance from the crimp groove to the rocker control. When the tool is used to crimp between live conductors, it is preferred to have a large distance as possible from the crimp groove to the hand of the operator. When the rocker control is actuated the motor spins the gears inside the transmission which moves the bevel disk. The bevel disk pushes on a wobble plate which causes the piston pump to reciprocate in a linear fashion. As a result the piston pump draws fluid from the reservoir and pumps it to section behind the piston ram. The piston ram moves toward the jaws and pushes on a roller mechanism. The rollers spread the jaws and make a crimp. To retract the jaws the rear section of the rocker control is activated. This pushes on the release button and opens a valve within the pump body and permits fluid back to the reservoir. The spring in front of the ram section pushes the ram back to its rest position. Of course, this is only one example. Features of the invention could be provided in other types of configurations and methods of use.

Figure 4:
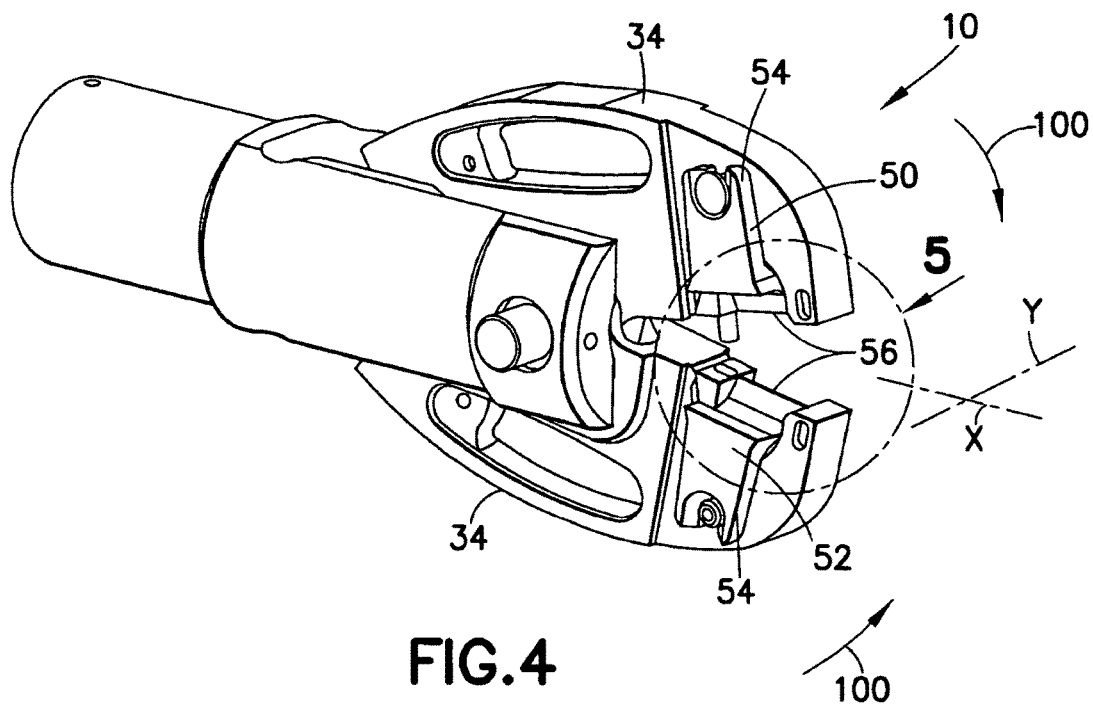
FIG. 4 is a perspective view of the working head of the tool shown in FIG. 1 having cutting dies attached to the jaws.
Figure 5:
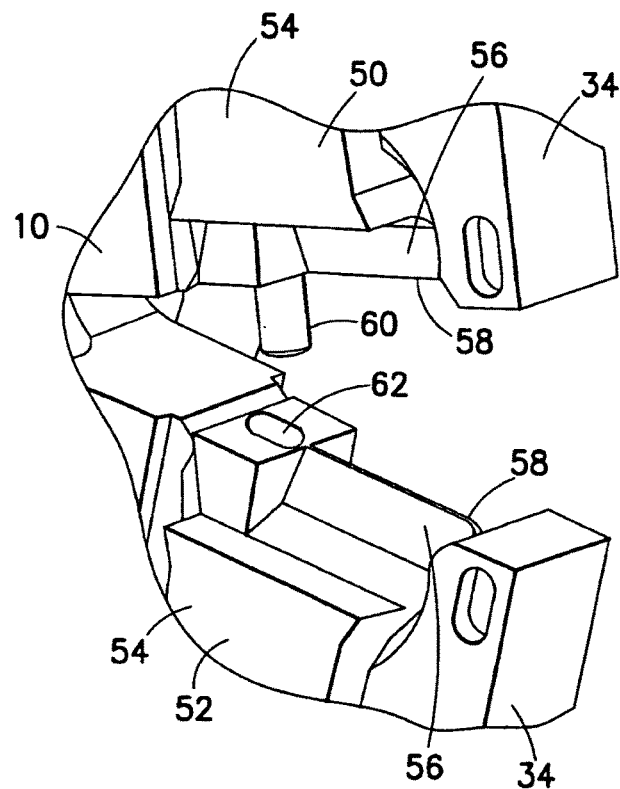
FIG. 5 is an enlarged view of a portion of the tool and dies shown in FIG. 4.

Referring also to FIGS. 4-5, the tool 10 is shown with cutting dies 50, 52 attached to the jaws 34. Although the invention will be described with reference to the example embodiments shown in the drawings, it should be understood that the invention can be embodied in many alternate forms of embodiments. In addition, any suitable size, shape or type of elements or materials could be used. Each cutting die 50, 52 has a mounting section 54 and a cutting section 56. Each mounting section 54 has a general U shape to mount on one of the jaws 34 and pin holes to receive portions of the spring biased locking pins on the jaws 34. The cutting sections 56 have cutting blade edges 58. The edges 58 can cut through a member when the edges are moved towards each other.

Figure 6:
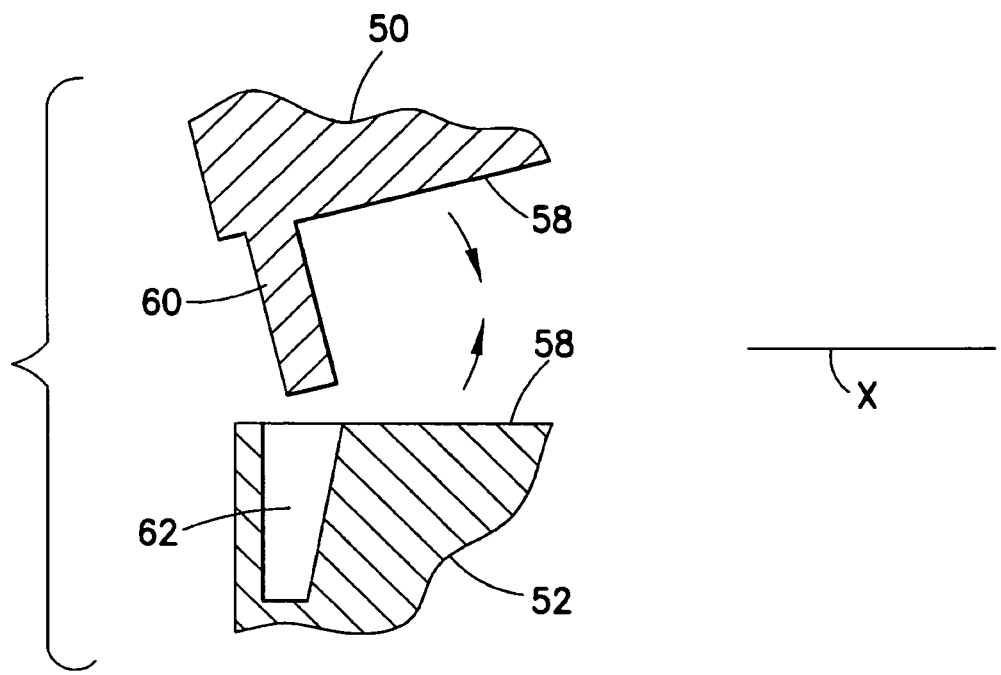
FIG. 6 is a partial cross sectional view of the dies shown in FIGS. 4-5.

The two dies 50, 52 comprises means for preventing lateral spreading of the jaws 34 and blades 50, 52 during cutting, which otherwise might occur for a particularly hard member being cut, such as a steel bar of a lock for example. In this embodiment the preventing means comprises a pin 60 on the first die 50 and a pin receiving hole 62 on the second die 52. Referring also to FIG. 6, when the two dies 50, 52 are moved towards each other, the pin 60 extends into the hole 62. This engagement helps to prevent the two dies 50, 52 from laterally moving relative to each other. Thus, the cutting edges 58 are kept aligned for an easier and cleaner cut of the member being cut.

Figure 6A:
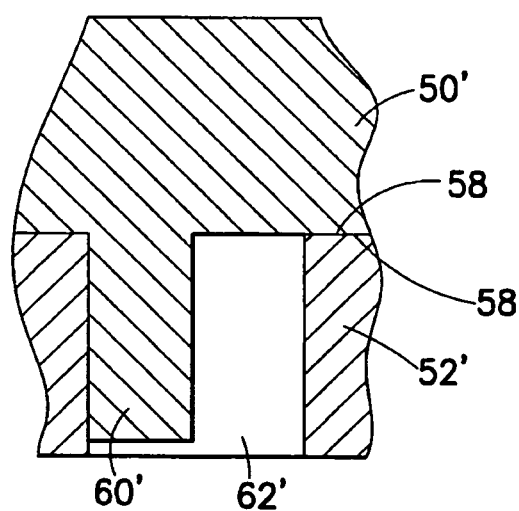
FIG. 6A is partial cross sectional view of an alternate embodiment of the dies shown in FIG. 6.

FIGS. 4 and 5 show the jaws 34 in an open position. When the tool 10 is actuated, the jaws 34 can pivot as indicated by arrows 100 towards a closed position. Because of this pivoting motion, the hole 62 has a different shape than the pin 60 as seen best in FIG. 6. The hole 62 is larger than the pin 60 in the longitudinal direction along the longitudinal axis X. The hole 62 could be a through hole or a dead-end hole, and the hole 62 could be uniform or shaped (such as being larger at its opening than at its bottom). For a through hole, the hole could have a generally uniform elongated shape in the longitudinal X axis as shown by the hole 62' in FIG. 6A. In the embodiment of FIG. 6A, the hole 62' has a suitable shape for clearance for the pin 60' as the two blades 50', 52' pivot relative to each other into the final cutting position shown.

Because the hole 62 is larger than the pin 60 in the longitudinal direction along the longitudinal axis X, this provides clearance of the pin 60 to move into its final position in the hole 62 to accommodate their arced paths relative to each other. The curved path of the blades relative to each other presented a problem which tool having straight linear moved blades (such as U.S. Pat. No. 6,792,789 B1 for example) did not have to face. Although the dimensions of the pin and hole are different in their longitudinal directions, their widths in the lateral directions along the lateral axis Y can be substantially the same.

In C-head type of cutting tool, such as shown in U.S. Pat. No. 6,792,789 B1 for example, the cutting blades are designed to pass laterally adjacent each other. However, with the embodiment shown in FIGS. 4-6, the blade edges 58 are designed to substantially stop when they meet; in a butting edge-to-edge type of engagement. This edge-to-edge type of cutting can provide a cleaner cut in some instances versus a passing side-by-side type of cutting blade arrangement, and less risk of torque on the blades during cutting (which could otherwise promote outward lateral shifting of the blades relative to each other).

In a preferred embodiment, the pin 60 does not enter or engage the hole 62 until cutting by the cutting edge has already started, such as about one-half or one-third of the way into the cutting operation for example. This provides less risk of binding or interference during cutting because of the shorter possible length of engagement by the pin/hole 60/62 versus the cutting on the article being cut.

Figure 7:
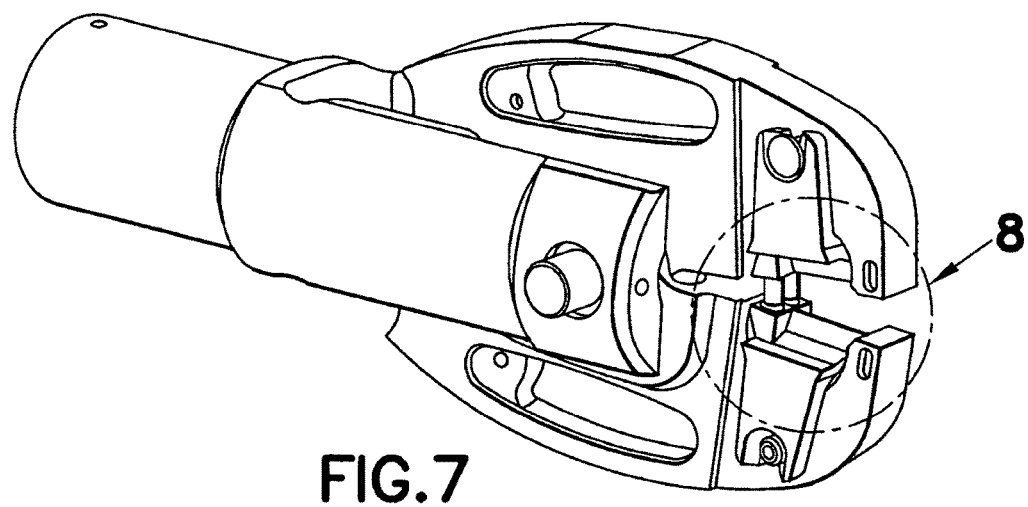
FIG. 7 is a perspective view of the working head of the tool shown in FIG. 4 having an alternate embodiment of the cutting dies attached to the jaws.
Figure 8:
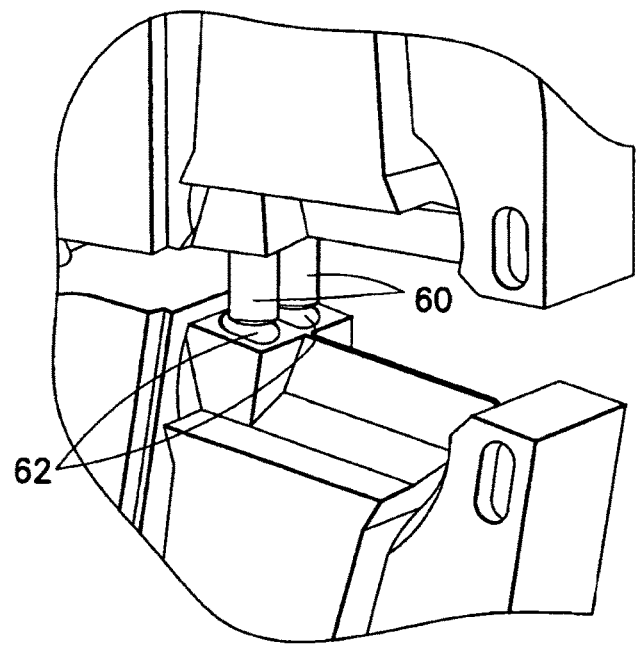
FIG. 8 is an enlarged view of a portion of the tool and dies shown in FIG. 7.

FIGS. 7-8 shows an alternate embodiment wherein the first die has two spaced pins at the rear end of the cutting edge, and the second die has two spaced pin receiving holes.

Figure 9A:
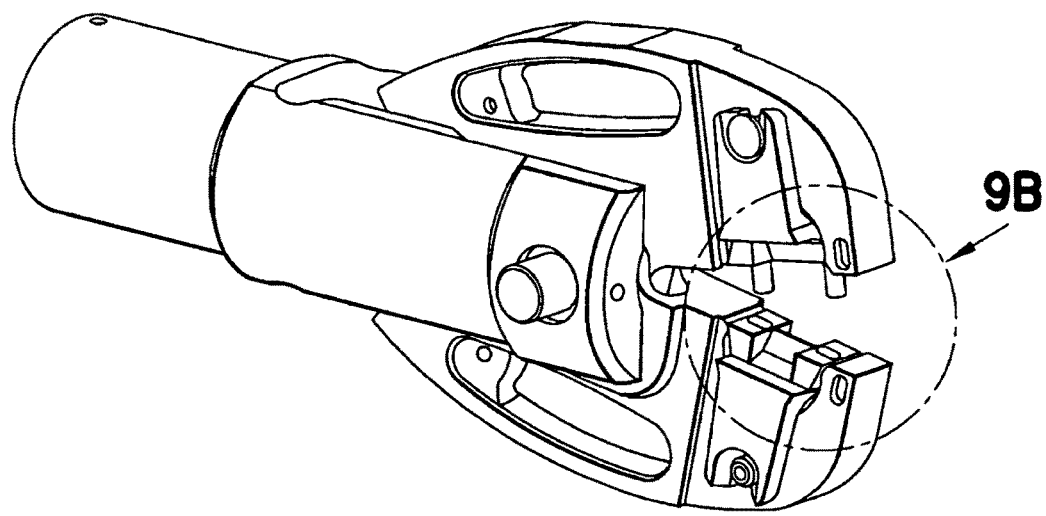
FIG. 9A is a perspective view of the working head of the tool shown in FIG. 4 having an alternate embodiment of the cutting dies attached to the jaws.
Figure 9B:
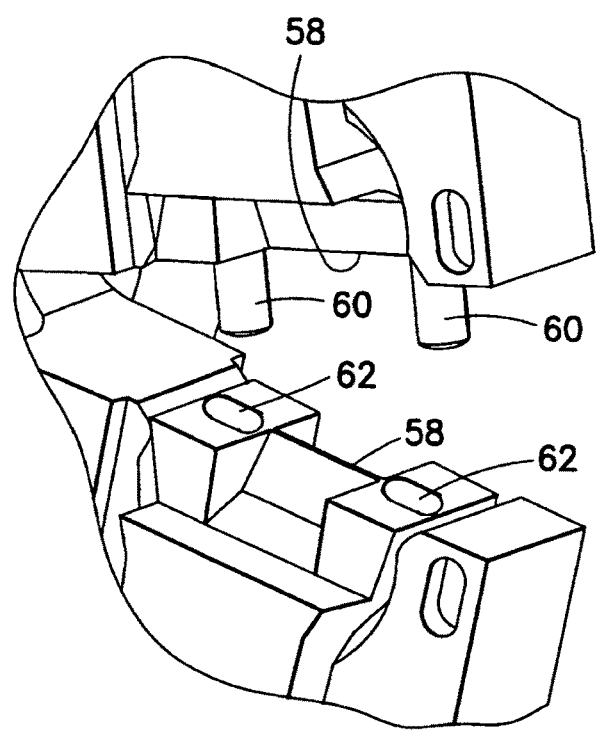
FIG. 9B is an enlarged view of a portion of the tool and dies shown in FIG. 9A.

FIGS. 9A and 9B show an alternate embodiment wherein the first die has two spaced pins; one at the rear end of the cutting edge and one at the front end of the cutting edge. The second die has two spaced pin receiving holes; one at the rear end of the cutting edge and one at the front end of the cutting edge.

Figure 10A:
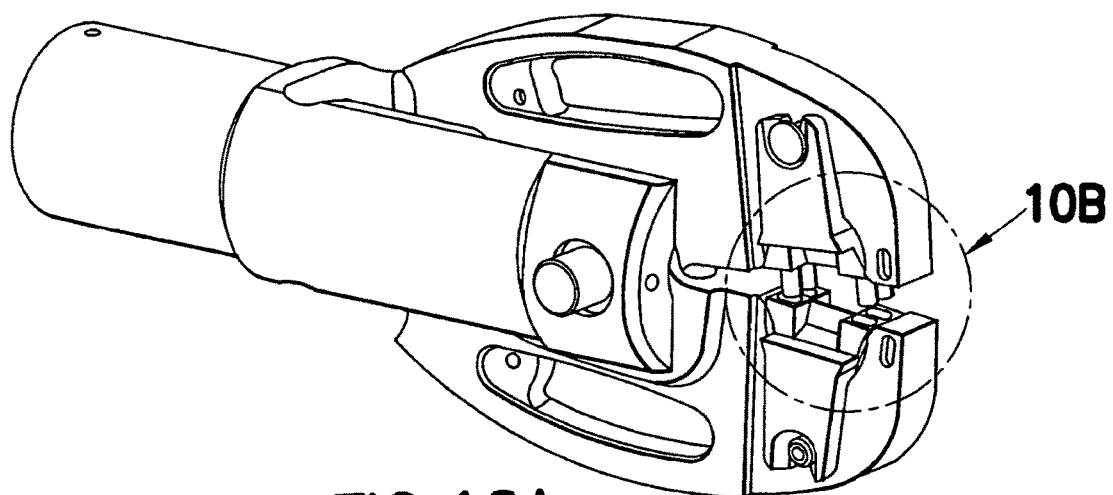
FIG. 10A is a perspective view of the working head of the tool shown in FIG. 4 having an alternate embodiment of the cutting dies attached to the jaws.
Figure 10B:
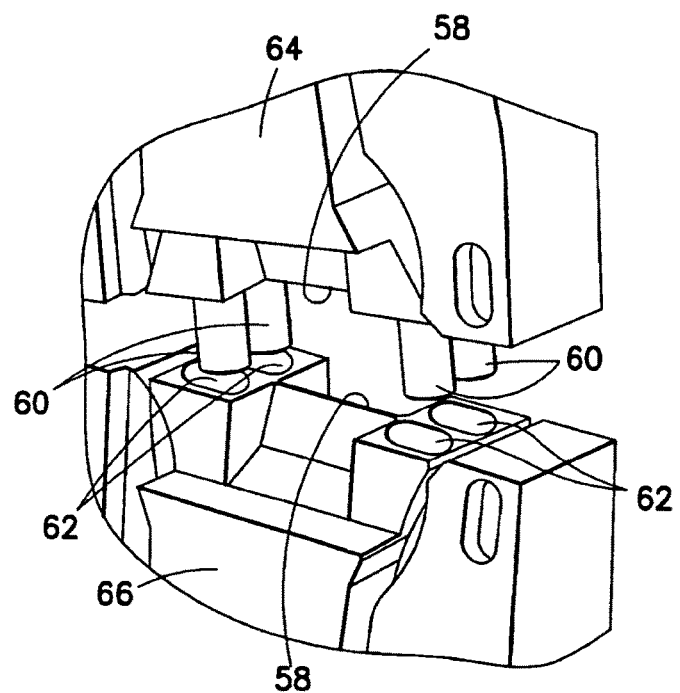
FIG. 10B is an enlarged view of a portion of the tool and dies shown in FIG. 10A.
Figure 11B:
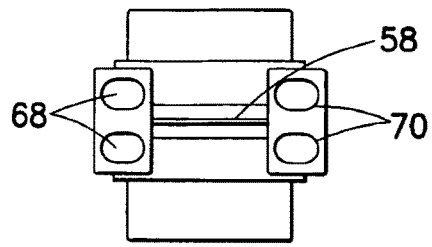
FIGS. 11A-11E show various views of the lower die shown in FIGS. 10A-10B.
Figure 11A:
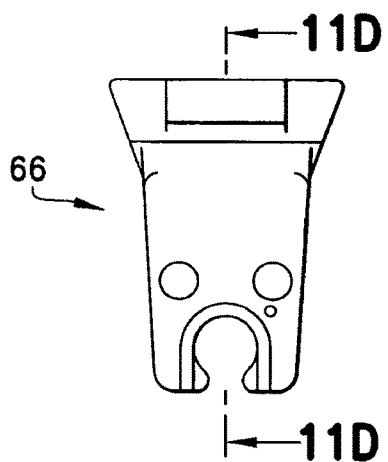
Figure 11D:
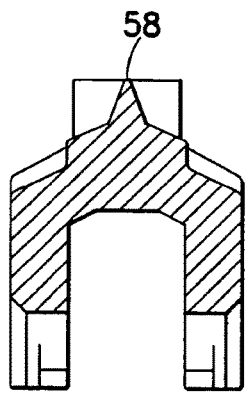
Figure 11E:
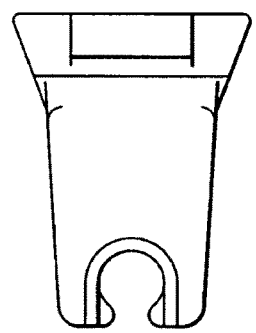
Figure 11C:
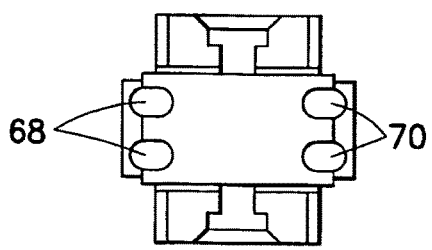

FIGS. 10A and 10B show an alternate embodiment with a first die 64 and a second die 66. The first die has four spaced pins; two at the rear end of the cutting edge and two at the front end of the cutting edge. FIGS. 11A-11E show various views of the second die 66. The second die 66 has four spaced pin receiving holes; two holes 68 at the rear end of the cutting edge and two holes 70 at the front end of the cutting edge. The embodiments of FIGS. 9 and 10 are probably the best embodiments (with pins and holes at both the front and rear ends of the blades) to give the least amount of relative movement of the blades or dies relative to each other. Please note that although cross sectionally round shaped pins are shown, any suitable cross sectional shape could be provided.

These alternate embodiments illustrate that various pin/hole configurations could be provided. For example, the first die could have one pin at the rear end of the cutting edge and one pin receiving hole at the front end of the cutting edge. Thus, the second die could have one pin at the front end of the cutting edge and one pin receiving hole at the rear end of the cutting edge. These are examples only.

Figure 12:
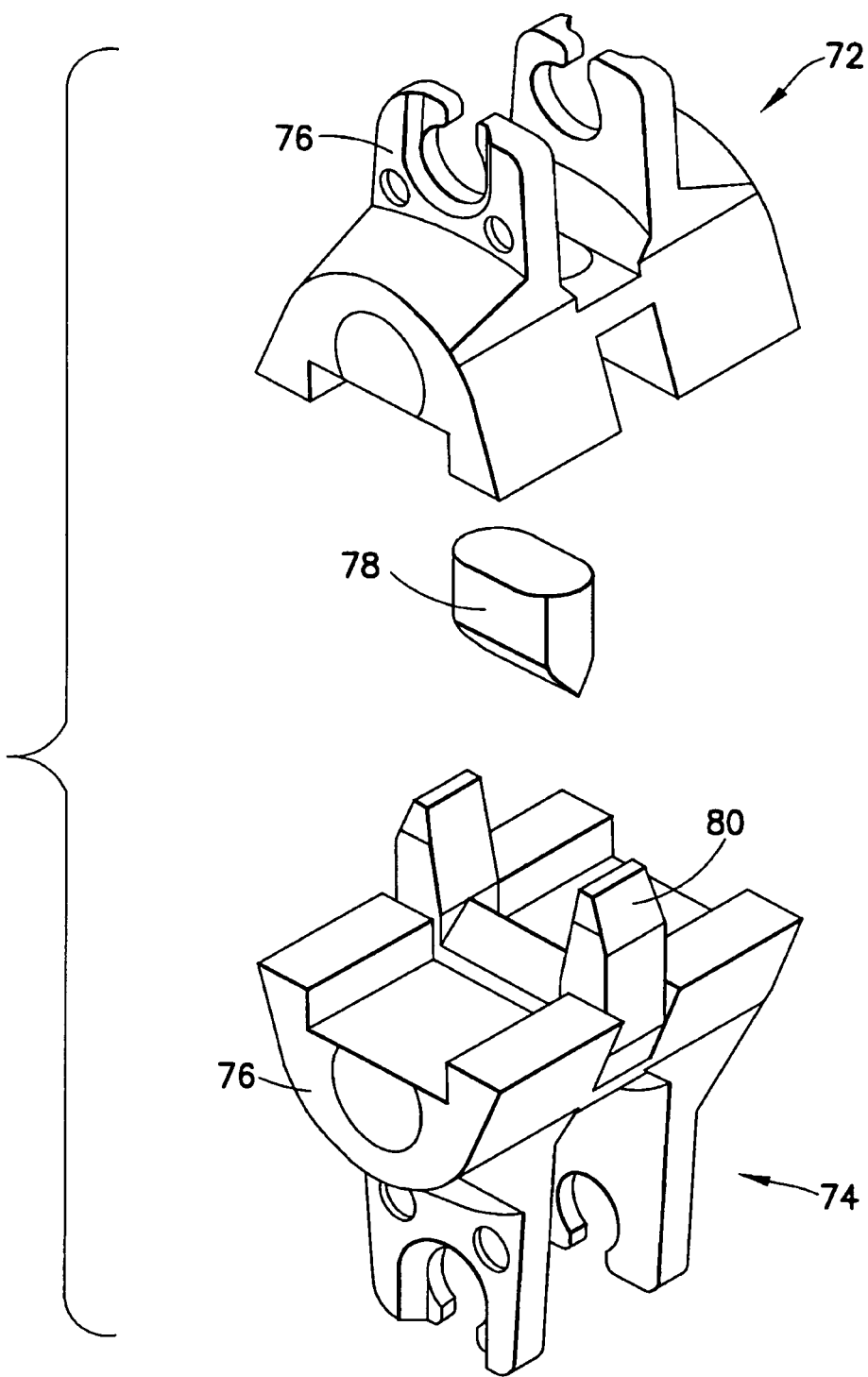
FIG. 12 is an exploded perspective view of a pair of dies of an alternate embodiment of the invention.

Referring also to FIG. 12, an alternate embodiment is shown. Two cutting dies 72, 74 are shown. The first cutting die 72 has a mounting section 76 and a removable cutting blade 78. The second cutting die 74 has a mounting section 76 and a removable cutting blade 80. The dies 72, 74 are sized and shaped to substantially prevent lateral in axis Y and longitudinal movement in axis X when they start to come together during cutting. In the embodiment shown in FIG. 12, the idea is that the field-goal post shaped removable blade has arms that fit into recesses in the upper die. The removable cutting blades are inserted into slots in the dies. The idea is similar to the post/pin arrangement shown in the other embodiments noted above, except that alignment/strain relief pins or protrusions are machined or cast into the removable blade. Additionally, the field goal post have angles that allow the cutting blades approach each other in an angular motion opposed to only linear motion commonly used on other cutters. The composite or multi-piece design allows members of the assembly to have different hardnesses, such as the removable cutting blade and guide being very hard, and the mounting section 76 being relatively softer. In an alternate embodiment, the members of an assembly, such as 78 and 80 for example, could be permanently fixed after assembly, such as by welding for example.

Figure 14:
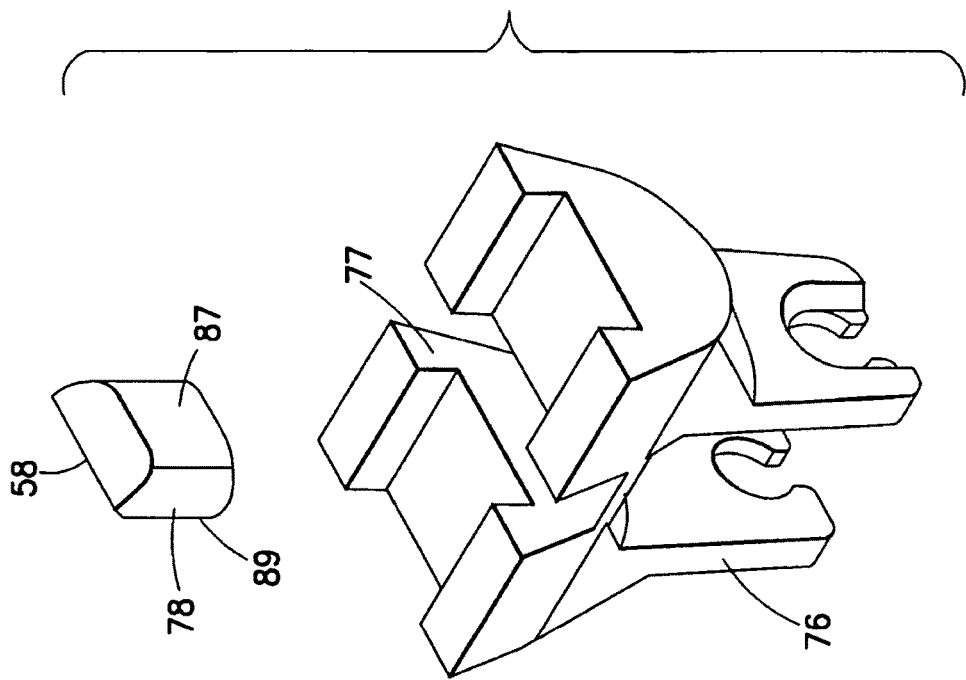
FIG. 14 is an exploded perspective view of the die shown in FIG. 13.
Figure 13:
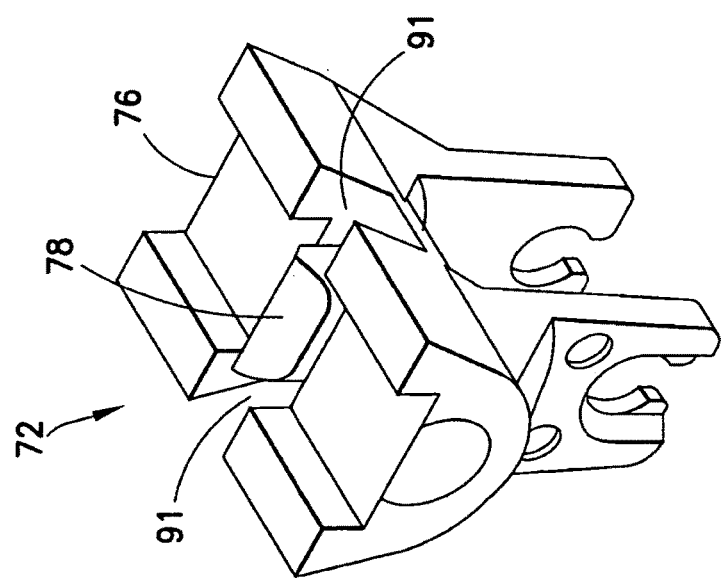
FIG. 13 is a perspective view of another alternate embodiment of the dies.
Figure 15:
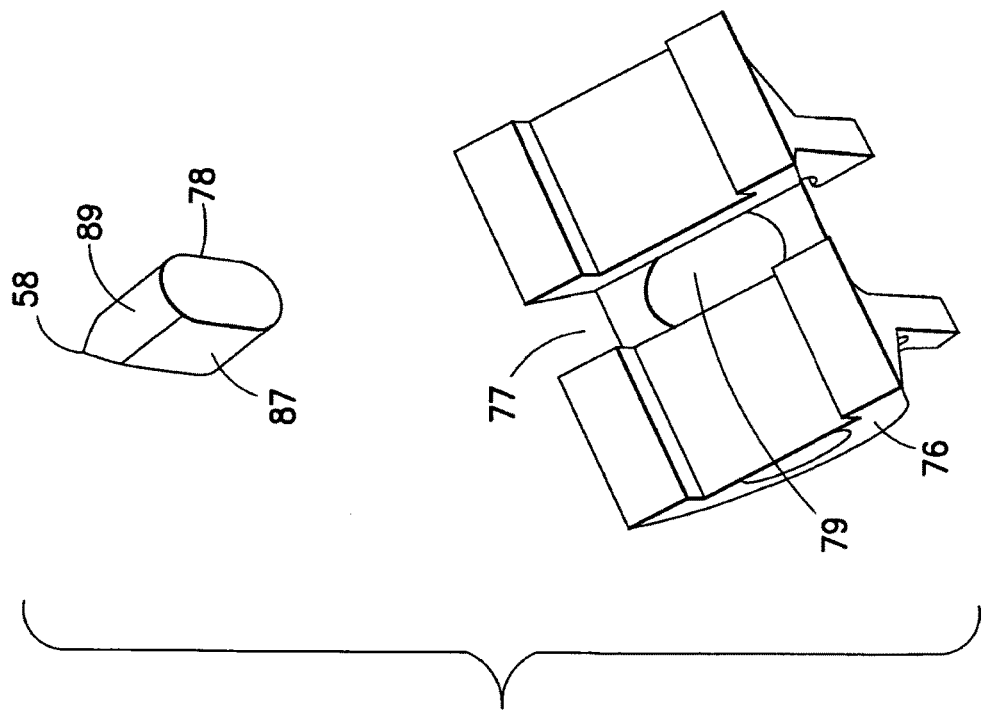
FIG. 15 is an exploded perspective view of the die shown in FIG. 13.

FIGS. 13-15 show various views of the first cutting die 72. The mounting section 76 has a blade receiving slot 77 and a blade mounting or locating hole or pocket 79. The removable cutting blade 78 is mounted in the hole 79 and extends out of the slot 77. The blade 78 has a cutting edge 58, and lateral exterior surfaces on opposite sides which contact lateral surfaces of the slot 77. This prevents lateral movement of the blade 78. The other two sides 89 engage with the interior facing surfaces of the guide posts 83 (see FIGS. 16-18) of the mating die or cutter. Open areas 91 are configured to receive the leading ends of the guide posts 83.

Figure 16:
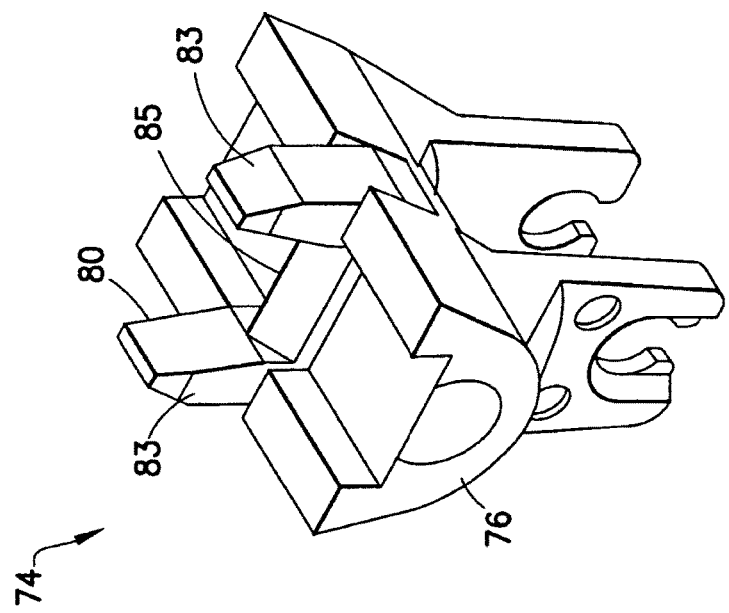
FIG. 16 is a perspective view of another alternate embodiment of a die for use with the die shown in FIGS. 13-15.
Figure 17:
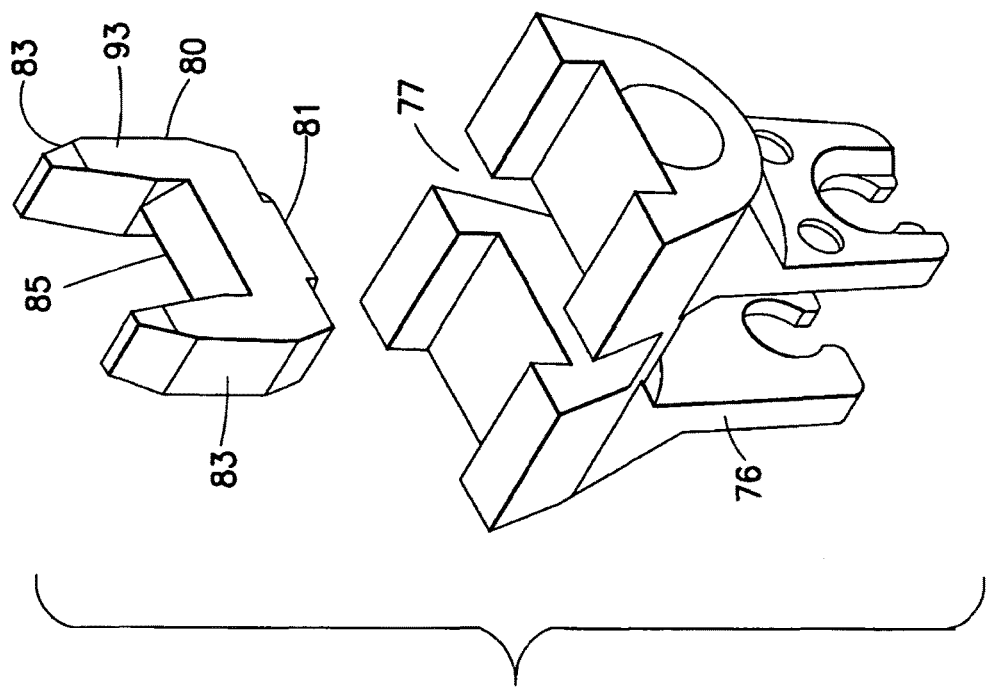
FIG. 17 is an exploded perspective view of the die shown in FIG. 16.

FIGS. 16-18 show various views of the second cutting die 74. The mounting section 76 is identical to the mounting section of the first cutting die 72. However, in alternate embodiments, they could be different. The removable cutting blade 80 has a bottom section 81 which is fixedly mounted in the hole 79, a middle section located in a majority of the slot 77, and top sections 83, 85 which extend out of the slot 77. The sections 83, 85 comprise guide posts 83 and cutting edge 85. The guide posts 83 help to prevent lateral movement and longitudinal movement of the blades relative to each other by moving into the areas 91 and receiving the leading end of the blade 78 between the posts 83. The interior facing surfaces of the posts 83 prevent longitudinal movement when engaged with the mating die or cutter. The surfaces of the opposite sides at 93, 95 prevent lateral movement when engaged with the mating die or cutter.

Figure 19:
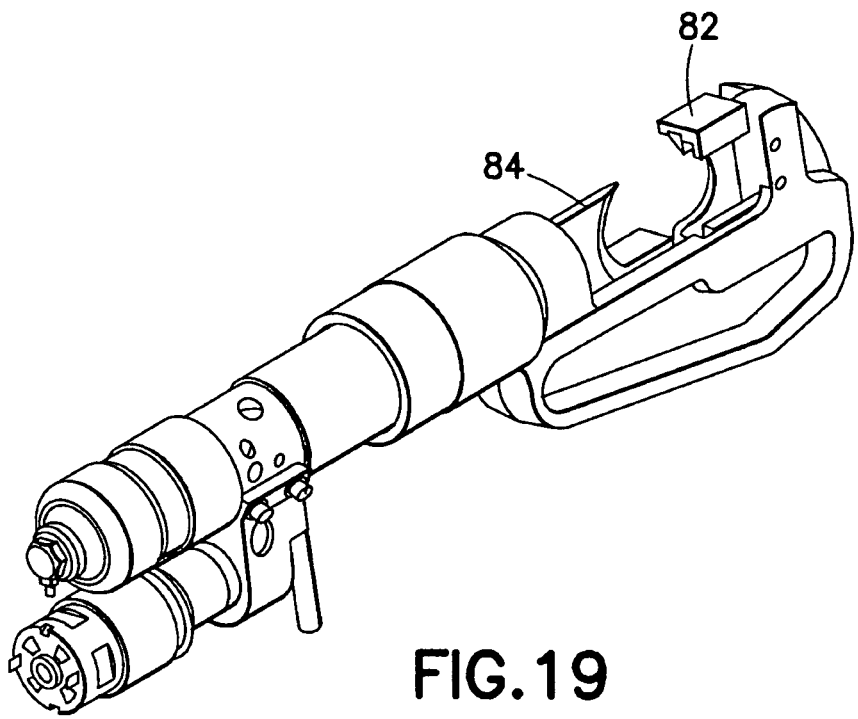
FIG. 19 is a perspective view of some components of an alternate embodiment of the invention.
Figure 20:
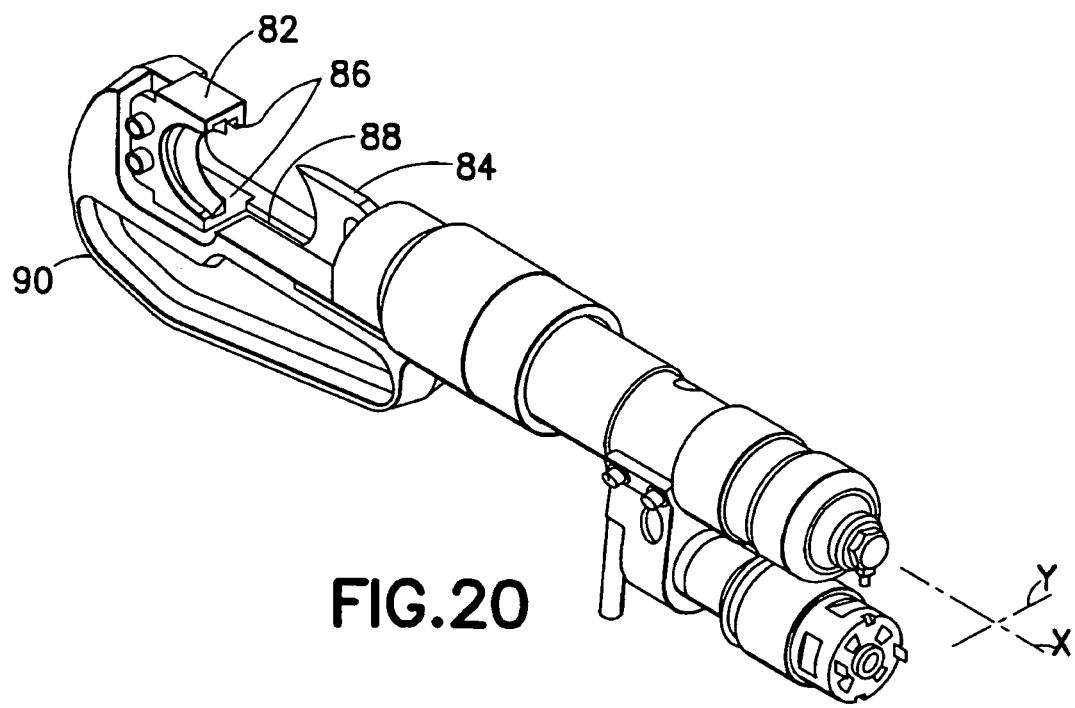
FIG. 20 is a perspective view of the components shown in FIG. 19 from a difference direction.
Figure 21:
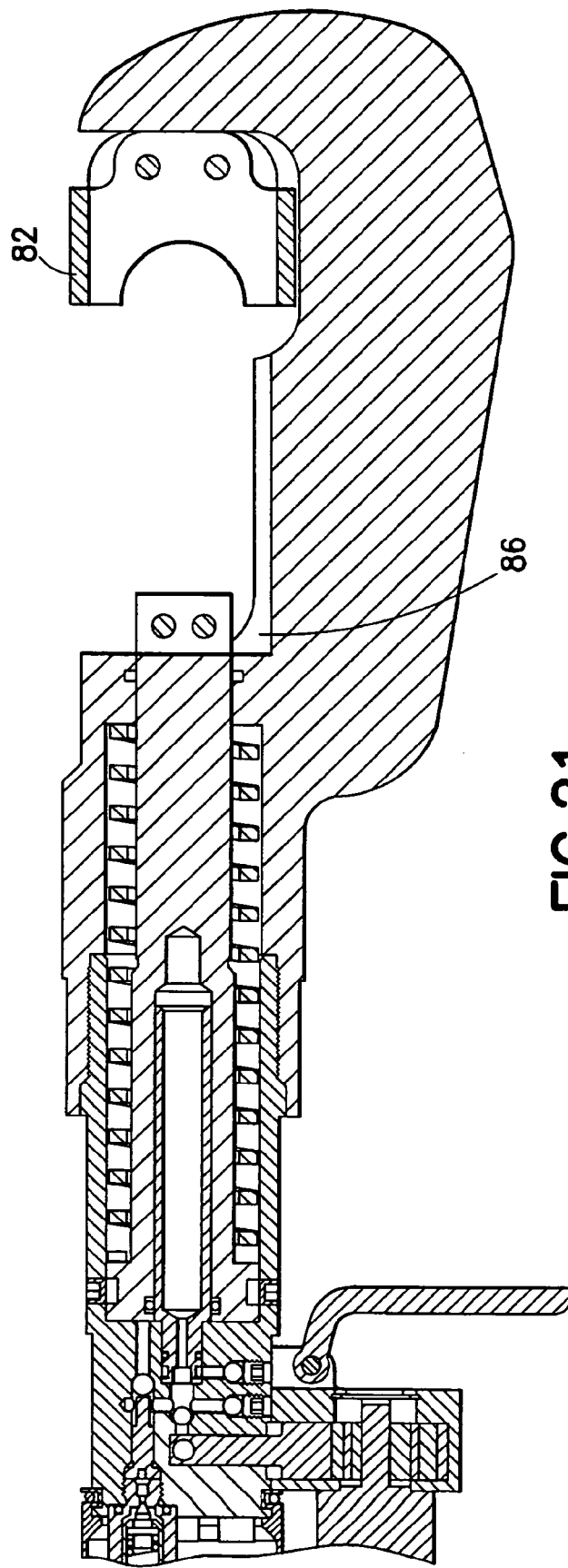
FIG. 21 is a partial cross sectional view of some of the components shown in FIGS. 19-20.

Referring also to FIGS. 19-21, an alternate embodiment of the invention is shown for use with a hydraulic tool having a "C" shaped working head. With this embodiment an idea here is to use a groove in one cutting head or die that receives a tab of the opposed head/die. The fixed blade 82 has a guide slot or track for the moving blade 84. The working head has an asymmetric seat or area for mounting the fixed blade 82. The working head also has extra material to limit deflection about the Y axis. The bottom of the linear moving blade 84 is held in a track 88 in the head 90 until it is close to the fixed blade 82 and close to starting the cut. At that point the moving blade 84 is guided on its top and bottom by the track(s) in the fixed blade and/or in tracks in a guide mounted over the fixed blade.

With the invention, the tool can be used to cut a metal member, such as a steel lock used to restrict access to an electrical panel for example. The dies 50, 52 are configured to be mounted in W-Die grooves of the tool 10. The cutting dies can mount on any set of crimp jaws that are designed to hold the W-Dies. Alternatively, the mounting sections 54 could be sized and shaped to mount on any suitable die mounting area of a tool. Each unique blade mounts in one side of the jaws. One of the blades has one or more pins to guide the blades and the jaws during the cut. This prevents spreading of the jaws and blades if the steel lock being cut is not held perpendicular to the blade edges.

One idea is the use of guidance/support pins on one crimping or cutting die, wherein the pins engage slots or holes on an opposite crimping die. The pins (or alternatively, wedges) keep the dies from shifting or rotating out of the cutting plane during cutting/crimping of work pieces that are angled with respect to the ground.

Figure 22:
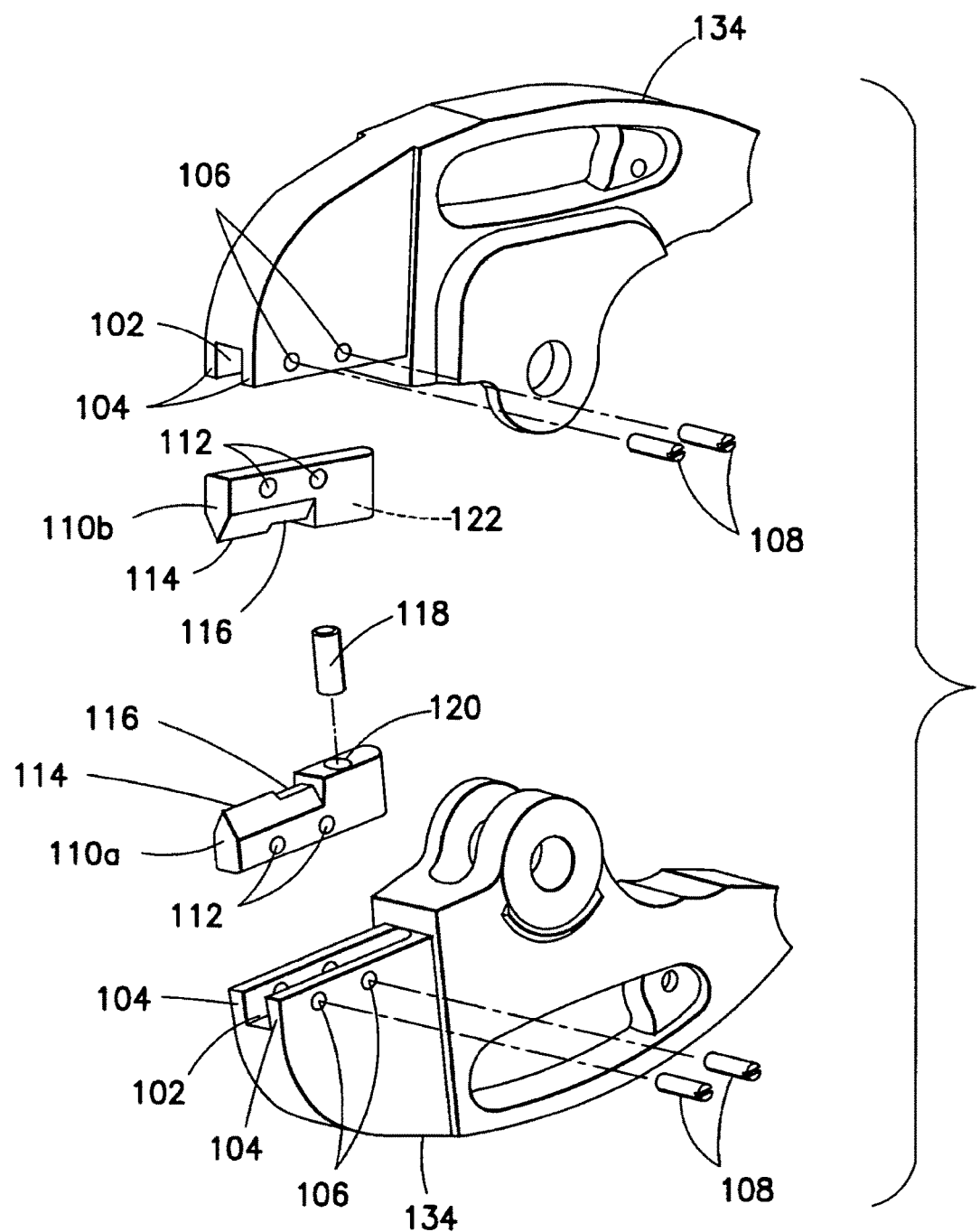
FIG. 22 is an exploded view of a pair of jaws having removable inserts in another alternate embodiment of the invention.

Rather than a "cutter die" with a conventional mounting section 54 (having a general U shape to mount on one of the jaws 34 and pin holes to receive portions of the spring biased locking pins on the jaws 34), the invention can be provided as a plug-in "insert" into a jaw. One embodiment of this is shown in FIG. 22. As seen in FIG. 22, each of the opposing jaws 134 has an insert receiving pocket 102. Lateral side walls 104 of each pocket 102 has holes 106 to receive the mounting fasteners 108. The holes 106 and fasteners 108 could be threaded for example to provide a removable connection of the plug-in inserts 110a, 110b (collectively referred to as 110).

The first plug-in insert 110a comprises a one-piece metal member with lateral mounting holes 112, a cutting edge 114, and a crimp area 116. An alignment or interlock pin 118 is fixedly mounted in a hole 120. The base of the insert 110a is located in the pocket 102 of the bottom jaw 134, and the fasteners 108 are able to fixedly secure the insert 110a in the pocket.

The second plug-in insert 110b comprises a one-piece metal member with lateral mounting holes 112, a cutting edge 114, a crimp area 116, and an alignment or interlock hole 122. The base of the insert 110b is located in the pocket 102 of the top jaw 134, and the fasteners 108 are able to fixedly secure the insert 110b in that pocket. The alignment hole 120 has a different cross sectional shape than the alignment pin 118 in order to accommodate the arced path of the pin 118 as the jaws 134 are pivoted closed. Similar to the embodiments described above, the alignment pin 118 can enter the alignment hole 120 during cutting and/or crimping to prevent the two inserts 110a, 110b from laterally shifting relative to each other during cutting/compression of a member between the inserts 110.

Figure 23:
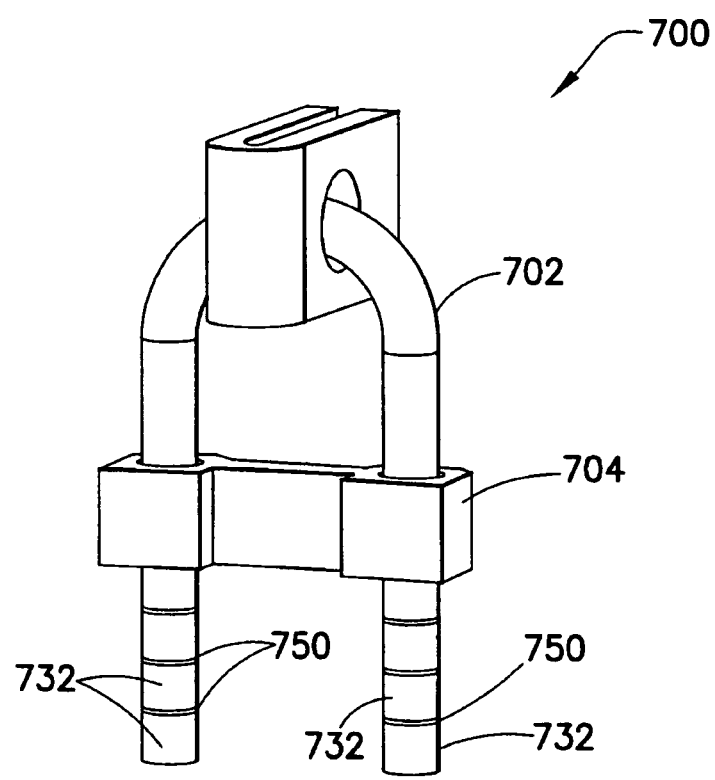
FIG. 23 is a perspective view of a reusable lock assembly.

Referring also to FIG. 23, a reusable lock or lock assembly 700 is shown. The lock assembly 700 is similar to the lock assembly shown in U.S. Provisional Application No. 61/186,939 filed Jun. 15, 2009 which is hereby incorporated by reference in its entirety. The lock assembly 700 comprises a bolt member 702 and a lock bar 704. However, in this embodiment, the "U" bolt 702 comprises a plurality of operable regions 732 at each of the ends of the "U" bolt 702. For example, as shown in FIG. 23, the "U" bolt may comprise four operable regions 732 on each end. The operable regions 732 are configured to allow for deforming operations to be performed thereon, such as being crimped to prevent the bar 704 from being removed.

For example, according to one embodiment of the invention the lock 700 may be a re-usable tamper-evident lock. Locks of this type may be applied to electrical meters (or other electrical equipment) so that any tampering would be evident if the lock is broken, missing, or the indicia does not match a previously known condition. For example, as shown in FIG. 23, the "U" bolt 702 may comprise indicia lines or indentations 750 and numbers, wherein each of the operable regions 732 comprises one of the numbers and each of the numbers and may be separated by the indicia lines 750. When a service technician opens the electrical cabinet/panel by removing the lock assembly 700, the service technician may compare the last remaining number/indicia on the "U" bolt 702 against a log entry for a previous service report (or maintenance call).

It should be noted that although FIG. 23 illustrates four operable regions 732 on each end of the "U" bolt 702, any suitable number of operable regions may be provided. Additionally, any other suitable marking/indicia may be provided on the operable regions, such as letters for example.

Additionally, an inspection of a crimp marking/imprint (or any other suitable marking) on the operable region 732 may indicate potential tampering. For example, according to one example, the crimp area 116 may be provided for making a desired marking (or indicia), wherein upon inspection of the marking on the operable region a service technician (or other user of the lock) would be able to determine whether or not the last crimp operation was performed by an approved die and/or an authorized person (for example, a crimp marking not having the desired markings may indicate tampering).

The crimping areas 116 of the inserts 110 shown in FIG. 22 can be used to crimp the regions 732. The cutting edges 114 of the inserts 110 can be used to cut off the regions 732 at the indicia lines 750. In a preferred embodiment of the "insert", the crimp area 116 is not provided. Instead, the cutting edge 114 is longer. Thus, the inserts can be used for cutting, but not crimping.

Figure 24:
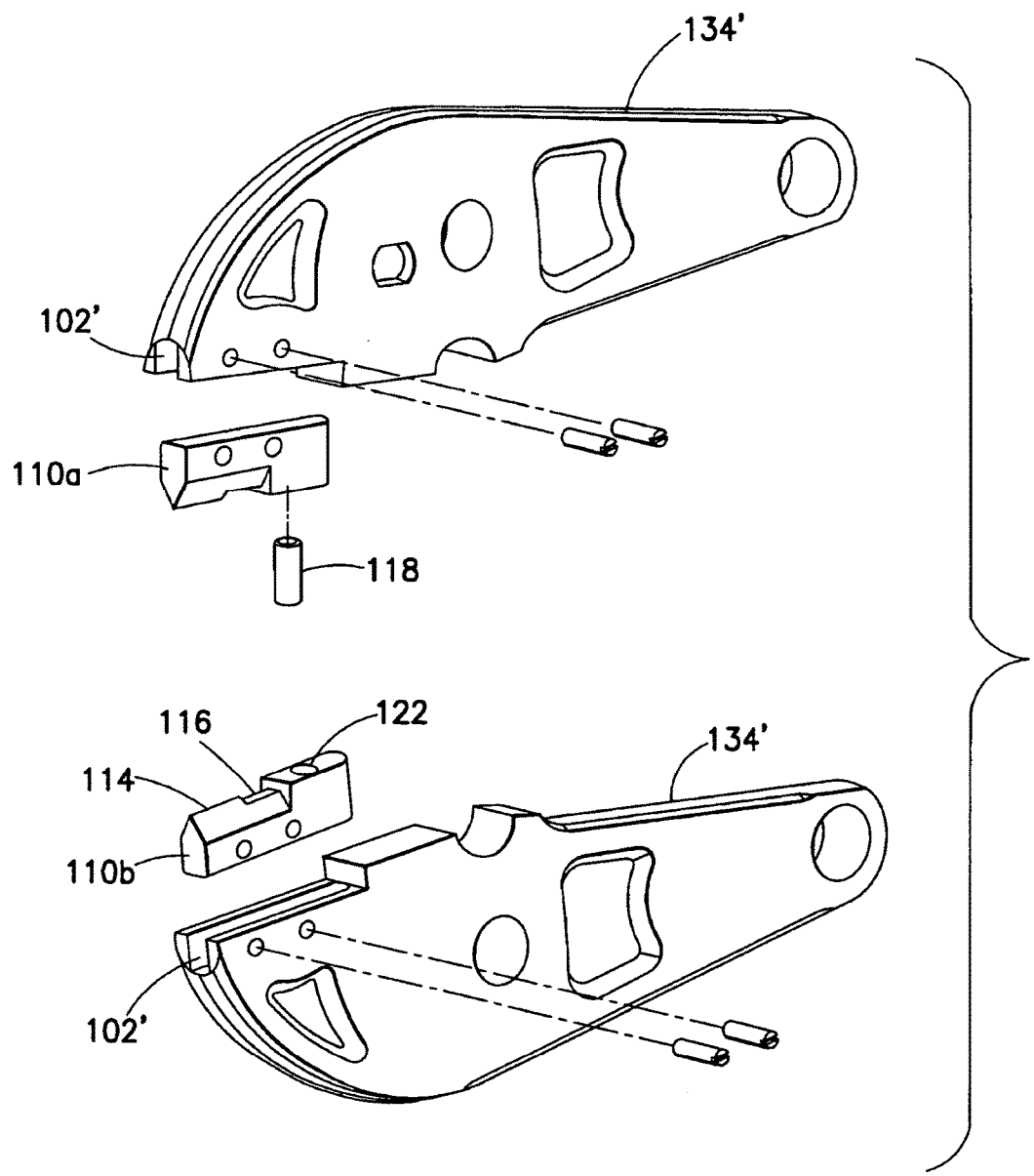
FIG. 24 is an exploded view of a pair of jaws of another alternate embodiment of the invention having the removable inserts of FIG. 22.

Referring also to FIG. 24, the inserts 110 are shown being removably connected to a different set of jaws 134' in pockets 102'. Thus, the inserts 110 can be used with different hydraulic operated tools for cutting members.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:

1. Hydraulic tool cutting dies comprising:
   a first cutting die having a first mounting section and a first blade cutting edge, wherein the first mounting section is sized and shaped to removably attach to a hydraulic tool;
   a second cutting die having a second mounting section and a second blade cutting edge, wherein the second mounting section is sized and shaped to removably attach to the hydraulic tool;
   wherein the first cutting die comprises a post extending past the first cutting edge and the second cutting die comprises a post receiving hole which has a different cross-sectional shape than the post, where the post contacts a side of the post receiving hole in a closed position of the first and second cutting dies relative to each other, where the first blade cutting edge does not extend into the post receiving hole in the closed position, where the post is at least partially located in a plane with the first blade cutting edge, where the post and the first blade cutting edge are located one behind the other.

2. Hydraulic tool cutting dies as in claim 1 wherein the post receiving hole is larger than the post in a longitudinal direction along a longitudinal axis X from front to back of the dies.

3. Hydraulic tool cutting dies as in claim 1 wherein the post receiving hole is larger at an opening into the post receiving hole than at a bottom of the post receiving hole.

4. Hydraulic tool cutting dies as in claim 1 wherein the post receiving hole has a suitable shape to allow for clearance for the post as the first and second dies pivot relative to each other into a final cutting position.

5. Hydraulic tool cutting dies as in claim 1 wherein dimensions of the post and post receiving hole are different in their longitudinal directions, and wherein cross sectional widths of the post and the post receiving hole in lateral directions along a lateral axis Y are substantially the same.

6. Hydraulic tool cutting dies as in claim 1 wherein the first cutting die comprises the post and a second post proximate a rear end of the first cutting edge.

7. Hydraulic tool cutting dies as in claim 6 wherein the posts are located generally side by side.

8. Hydraulic tool cutting dies as in claim 6 wherein the second cutting die comprises the post receiving hole and a second post receiving hole proximate a rear end of the second cutting edge.

9. Hydraulic tool cutting dies as in claim 1 wherein the first cutting die comprises the post proximate a rear end of the first cutting edge and a second post proximate a front end of the first cutting edge.

10. Hydraulic tool cutting dies as in claim 9 wherein the second cutting die comprises the post receiving hole proximate a rear end of the second cutting edge and .a second post receiving hole proximate a front end of the second cutting edge.

11. Hydraulic tool cutting dies as in claim 1 wherein the post comprises a general field-goal post shape.

12. Hydraulic tool cutting dies as in claim 1 wherein the first mounting section comprises a first member, and the first cutting edge is on a first removable blade which is removably connected to the first member.

13. Hydraulic tool cutting dies as in claim 1 wherein the first cutting die comprises a first member forming the first mounting section and a second member connected to the first member, wherein the second member has a general field-goal post shape with the first cutting edge between the post and a second post.

14. Hydraulic tool cutting dies as in claim 1 wherein the post is mounted in a hole of a cutting member forming the first cutting die.

15. Hydraulic tool cutting dies as in claim 1 wherein the post contacts the second cutting die in the post receiving hole when the dies are closed.

16. Hydraulic tool cutting dies as in claim 1 wherein the post receiving hole is a hole into the second cutting die which is closed on all lateral sides.

17. Hydraulic tool cutting dies as in claim 1 wherein the first and second cutting dies each comprise a crimp area behind the cutting edges, and where the post and the post receiving holes are located behind the crimp areas.

18. Hydraulic tool cutting dies as in claim 1 wherein the first and second dies form member contact areas which are intended to contact a member between the first and second dies, where the post and the post receiving holes are located spaced away from the member contact areas.

19. A cutter comprising:
a hydraulic tool having pivoting jaws; and
the hydraulic tool cutting dies of claim 1 mounted to the jaws, wherein the post and the post receiving hole are sized and shaped such that the post extends into the post receiving holes when the jaws are pivoted relative to each other to keep the first and second cutting dies laterally aligned with each other during cutting.

20. A cutter as in claim 19 wherein the jaws, the post and the post receiving hole are sized and shaped such that the post does not enter the post receiving hole until cutting by the first and second cutting edges has already started.

21. A cutter as in claim 20 wherein the jaws, the post and the post receiving hole are sized and shaped such that the post enters the post receiving hole about one-half to one-third into a cutting operation.

* * * * *